US007117082B2

(12) United States Patent
Kohira et al.

(10) Patent No.: US 7,117,082 B2
(45) Date of Patent: Oct. 3, 2006

(54) CONTROLLER FOR INTERNAL COMBUSTION ENGINE

(75) Inventors: Sumiko Kohira, Kariya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/133,357

(22) Filed: May 20, 2005

(65) Prior Publication Data

US 2005/0274358 A1 Dec. 15, 2005

(30) Foreign Application Priority Data

Jun. 10, 2004 (JP) .............................. 2004-172394

(51) Int. Cl.
*G01M 15/05* (2006.01)

(52) U.S. Cl. ........................... 701/114; 73/1.75; 73/115

(58) Field of Classification Search ..................... None
See application file for complete search history.

(56) References Cited

U.S. PATENT DOCUMENTS 4,800,500 A 1/1989 Tanaka
5,611,311 A 3/1997 Tomisawa
6,367,317 B1 4/2002 Jaye
6,598,468 B1 * 7/2003 Zur Loye et al. .......... 73/117.3

FOREIGN PATENT DOCUMENTS

| | | |
|---|---|---|
| DE | 4216058 A1 | 11/1993 |
| JP | 2508635 | 4/1996 |
| JP | 11-210546 | 8/1999 |
| JP | 2001-55955 | 2/2001 |

OTHER PUBLICATIONS

French Search Report—Nov. 23, 2005 for FR 0505881.

* cited by examiner

*Primary Examiner*—Andrew M. Dolinar
(74) *Attorney, Agent, or Firm*—Nixon & Vanderhye P.C.

(57) ABSTRACT

An ECU converts a cylinder pressure P and a cylinder volume V corresponding to a crank angle θ at least from a compression stroke to a combustion and expansion stroke to a logarithmic value log P and a logarithmic value log V, respectively, to find a logarithmic conversion waveform and estimates a motoring waveform which is obtained by subtracting a pressure rise developed by combustion in a cylinder from the logarithmic conversion waveform, that is, corresponds to a non-combustion state. Further, the ECU computes a determination line Y of an ignition timing Tburn on the basis of the base line X of the estimated motoring waveform and determines the ignition timing Tburn on the basis of this determination line Y and the logarithmic conversion waveform.

17 Claims, 16 Drawing Sheets

CONTROLLER FOR INTERNAL COMBUSTION ENGINE

CROSS-REFERENCE TO RELATED APPLICATION

This application is based on Japanese Patent Application No. 2004-172394 filed on Jun. 10, 2004 the disclosure of which is incorporated herein by reference.

FIELD OF THE INVENTION

The present invention relates to a controller for an internal combustion engine that detects an ignition timing (timing of starting combustion) of an internal combustion engine on the basis of outputs of a cylinder pressure sensor and a crank angle sensor.

BACKGROUND OF THE INVENTION

In an internal combustion engine such as a diesel engine and a gasoline engine, it is important to detect the ignition timing of fuel in a cylinder in order to optimally control a timing of injecting fuel into a cylinder. This ignition timing of fuel can be determined by comparing a cylinder pressure waveform when fuel is combusted with a cylinder pressure waveform when fuel is not combusted (referred to as a motoring waveform) (see JP-2001-55955A). Here, the motoring waveform can be calculated by the use of a well-known polytropic equation ($PV^n$=constant, where P is cylinder pressure and V is cylinder volume).

Specifically, as shown in FIGS. 21A to 21C, a cylinder pressure at the time of combustion cycle is sensed by the cylinder sensor to find a cylinder waveform showing a change in the cylinder pressure to a change in a crank angle (FIG. 21A). Next, a motoring waveform is subtracted from the found cylinder pressure to find a differential waveform (FIG. 21B). This differential waveform shows a change in a combustion pressure developed by combustion in the cylinder, that is, a combustion pressure waveform. Then, a change point showing an increase in the combustion pressure is found from the combustion pressure waveform to detect an ignition timing Tburn from the change point (FIG. 21C).

By the way, the motoring waveform when fuel is not combusted is calculated (estimated) by the use of the above-described polytropic equation, but a coefficient used in this polytropic equation (polytropic exponent n) varies because of variations in internal combustion engines or varies because of variations in the operating state of the internal combustion engine (engine speed, boost pressure, cooling water temperature) and the like, for example, for each combustion cycle. For this reason, a method of providing the polytropic exponents n in a map has been conventionally used.

Further, to sense the above-described ignition timing Tburn of fuel, the correct crank position (angle) of the internal combustion engine needs to be found and hence a crank angle sensor is used for that purpose.

However, there is presented a problem that when a position where the crank angle sensor is mounted or variations in the engines cause an error in the value sensed by the crank angle sensor (crank angle), as shown in FIG. 22, the sensing accuracy of the ignition timing Tburn deteriorates.

In contrast to this, JP-11-210546A discloses a method of correcting the sensing error of a crank angle by the cylinder pressure of the internal combustion engine (referred to as cylinder pressure). That is, there is provided a method of correcting the crank angle in the following manner: as shown in FIG. 23, a point, at which a cylinder pressure sensed by the cylinder pressure sensor (referred to as motoring pressure) when fuel is not combusted in the internal combustion engine (combustion pressure by combustion in the cylinder is developed) becomes maximum, is assumed a top dead center (TDC) and the top dead center is compared with a TDC found from the crank angle sensor to correct the crank angle.

However, the method of sensing an ignition timing disclosed in JP-2001-55955 A presents the following problem.

That is, when a polytropic exponent "n" is found from a map, a change in the operating state of the internal combustion engine, in particular, variations in the internal combustion engines cannot be sufficiently corrected and hence the motoring waveform cannot be correctly estimated (calculated) to cause a sensing error in the ignition timing. Moreover, because the exponent of the polytropic equation needs to be calculated, a calculation load is made heavy. Hence, it is difficult for an ECU (electronic control unit) mounted on an actual vehicle to calculate the exponent of the polytropic equation at high speed for each combustion cycle. Therefore, it is difficult to employ the method described in JP-2001-55955 A.

On the other hand, according to the publicly known technology disclosed in JP-11-210546A, as shown in FIG. 24, in the vicinity of a maximum pressure point where the cylinder pressure becomes the maximum, a change in the cylinder pressure to a change in the crank angle becomes very moderate. Hence, when noises are caused in the sensing value of the cylinder pressure sensor by some factors, an error is caused in the sensing position of a TDC. In other words, when noises are not developed in the sensing value of the cylinder pressure sensor, a pressure maximum point is sensed in the vicinity of a crank angle θx in the drawing, whereas when noises are caused in the sensing value of the cylinder pressure sensor, for example, a pressure maximum point is sensed at a crank angle θy. Therefore, this presents a problem of causing an error in the TDC between θx and θy.

SUMMARY OF THE INVENTION

The present invention has been made on the basis of the above-described circumstances. The first object of the invention is to estimate a motoring waveform in an actual operating state with high accuracy irrespective of the operating state of an internal combustion engine or variations in the engines and to sense an ignition timing in a short time with high accuracy by reducing a calculation load for estimating the motoring waveform. The second object of the invention is to sense a correct compression top dead center (TDC) without the effect of noises at the time of correcting the angle error of a crank angle sensor by a cylinder pressure in the internal combustion engine sensed by a cylinder pressure sensor.

The present invention includes ignition timing detecting means for sensing the ignition timing of an internal combustion engine on the basis of information obtained from a cylinder pressure sensor and a crank angle sensor, and the ignition timing detecting means includes cylinder pressure converting means, cylinder volume converting means, cylinder pressure waveform logarithm display means, motoring waveform estimating means, determination line computing means, and ignition timing determining means.

The cylinder pressure converting means has a conversion map P for logarithmically converting a previously set pressure and converts such a cylinder pressure at least from a compression stroke to a combustion and expansion stroke that is sensed by the cylinder pressure sensor to a logarithmic value log P by the conversion map P.

The cylinder volume converting means has a conversion map V for logarithmically converting a cylinder volume corresponding to a previously set crank angle and converts a cylinder volume corresponding to such a crank angle at least from a compression stroke to a combustion and expansion stroke that is sensed by the crank angle sensor to a logarithmic value log V by the conversion map V.

The cylinder pressure waveform logarithm display means has a logarithm map having coordinate axes of a logarithmic value log V of the cylinder volume corresponding to the crank angle and a logarithmic value log P of the cylinder pressure and reads the logarithmic value log P and the logarithmic value log V in the logarithm map to display a change in the cylinder pressure at least from a compression stroke to a combustion and expansion stroke as a logarithmically converted cylinder pressure waveform on the logarithm map.

The motoring waveform estimating means estimates a non-combustion cylinder pressure waveform (referred to as "motoring waveform") which is obtained by subtracting a pressure rise developed by combustion in the cylinder of the internal combustion engine from the logarithmically converted cylinder pressure waveform, that is, corresponds to a state of non-combustion.

The determination line computing means computes the determination line of an ignition timing on the basis of the base line of the estimated motoring waveform.

The ignition timing determining means determines the ignition timing on the basis of the computed determination line and the logarithmically converted cylinder pressure waveform.

According to the above-described construction, such a cylinder pressure at least from a compression stroke to an expansion stroke that is sensed by the cylinder pressure sensor and the cylinder volume corresponding to a crank angle at least from a compression stroke to an expansion stroke that is sensed by the crank angle sensor are converted to the logarithmic value log P and the logarithmic value log V by the conversion map P and the conversion map V, respectively, and then by reading the logarithmic value log P and the logarithmic value log V in the logarithm map, a change in the cylinder pressure at least from a compression stroke to an expansion stroke can be displayed as the logarithmically converted cylinder pressure waveform on the logarithm map. Thus, it is possible to estimate the motoring waveform by the logarithmically converted cylinder pressure waveform without using a polytropic equation requiring an exponential computation and hence to reduce a computation load.

Further, according to the present invention, a conventional method of searching a map for a polytropic exponent n according to the operating state of the internal combustion engine, or variations in the internal combustion engines is not employed, but the logarithmically converted cylinder pressure waveform is found for each combustion cycle of the internal combustion engine and the motoring waveform is estimated from the found cylinder pressure waveform. Hence, the motoring waveform is not affected by a change in the operating state of the internal combustion engine, in particular, a change in the variations in the internal combustion engines. As a result, it is possible to estimate the motoring waveform for each combustion cycle with high accuracy and hence to improve the sensing accuracy of the ignition timing.

Further, the present invention includes compression top dead center sensing means that senses a compression top dead center by the sensing value (cylinder pressure) of the cylinder pressure sensor in a specific operating state where the cylinder pressure changes according to only the reciprocating motion of the piston without being affected by a combustion pressure developed by combustion in the cylinder, and TDC correcting means that corrects a TDC signal outputted by the crank angle sensor on the basis of the sensed compression top dead center.

The compression top dead center sensing means is characterized in that it has the sensing value of the cylinder pressure sensor (referred to as "base pressure"), which is sensed at a certain base crank angle (referred to as "base angle") when the piston moves up in the cylinder, inputted thereto and then senses a crank angle (referred to as "objective angle") at which the sensing value of the cylinder pressure sensor becomes equal to the base pressure when the piston moves down in the cylinder, and thereby senses a middle point between the base angle and the objective angle as the compression top dead center.

According to the above-described construction, a base angle is set at which a change in the cylinder pressure to the crank angle becomes large as compared with a change in the vicinity of the TDC and the cylinder pressure is sensed at the base angle. Hence, noises are less likely to cause errors in the sensing value of the cylinder pressure sensor. Therefore, it is possible to sense a correct TDC (compression top dead center).

DETAILED DESCRIPTION OF THE PREFERRED EMBODIMENTS

The preferred embodiments for implementing the present invention will be described in detail by the following embodiments.

[First Embodiment]

Figure 4:
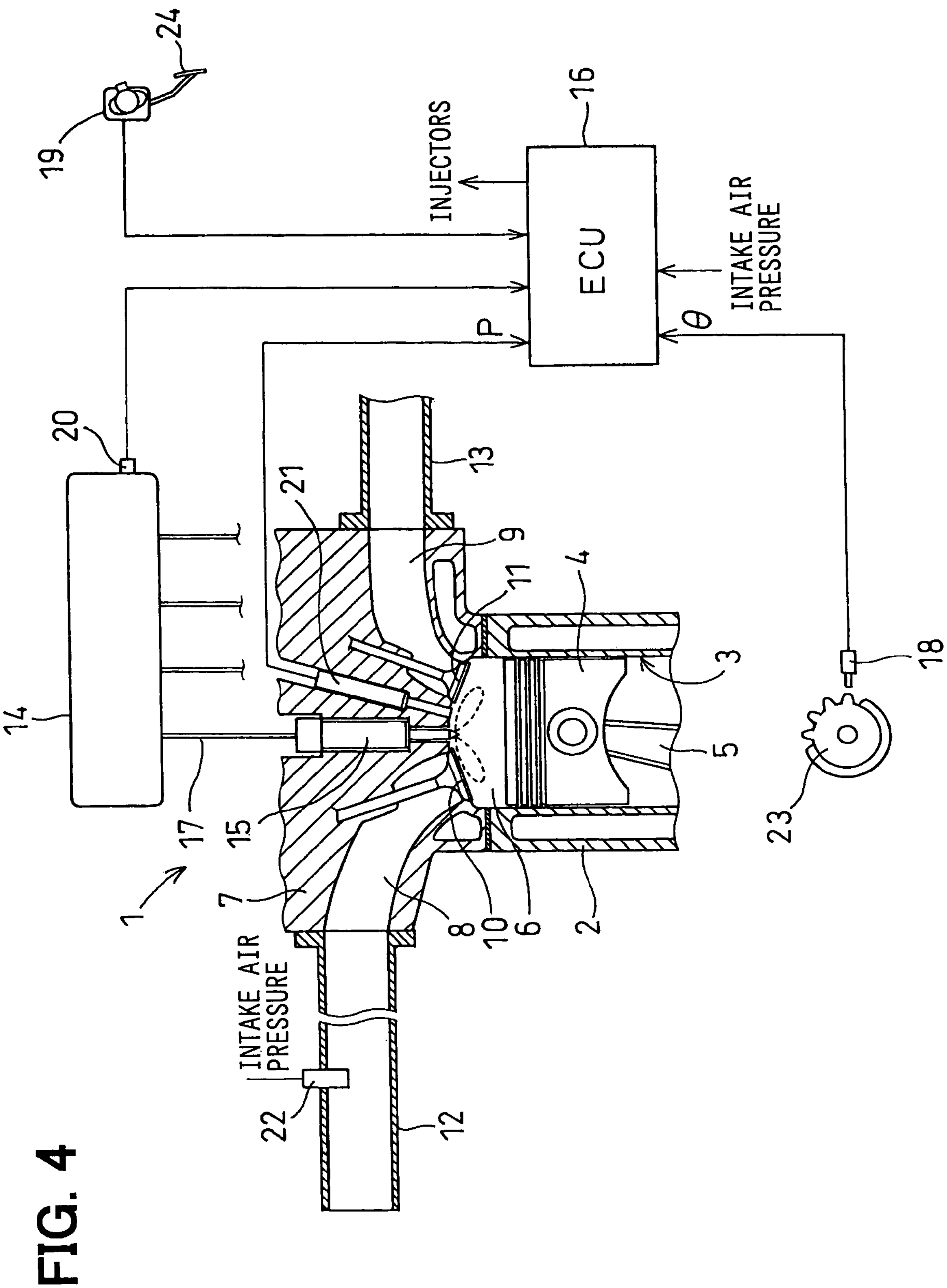
FIG. 4 shows the construction of a diesel engine.
Figure 5:
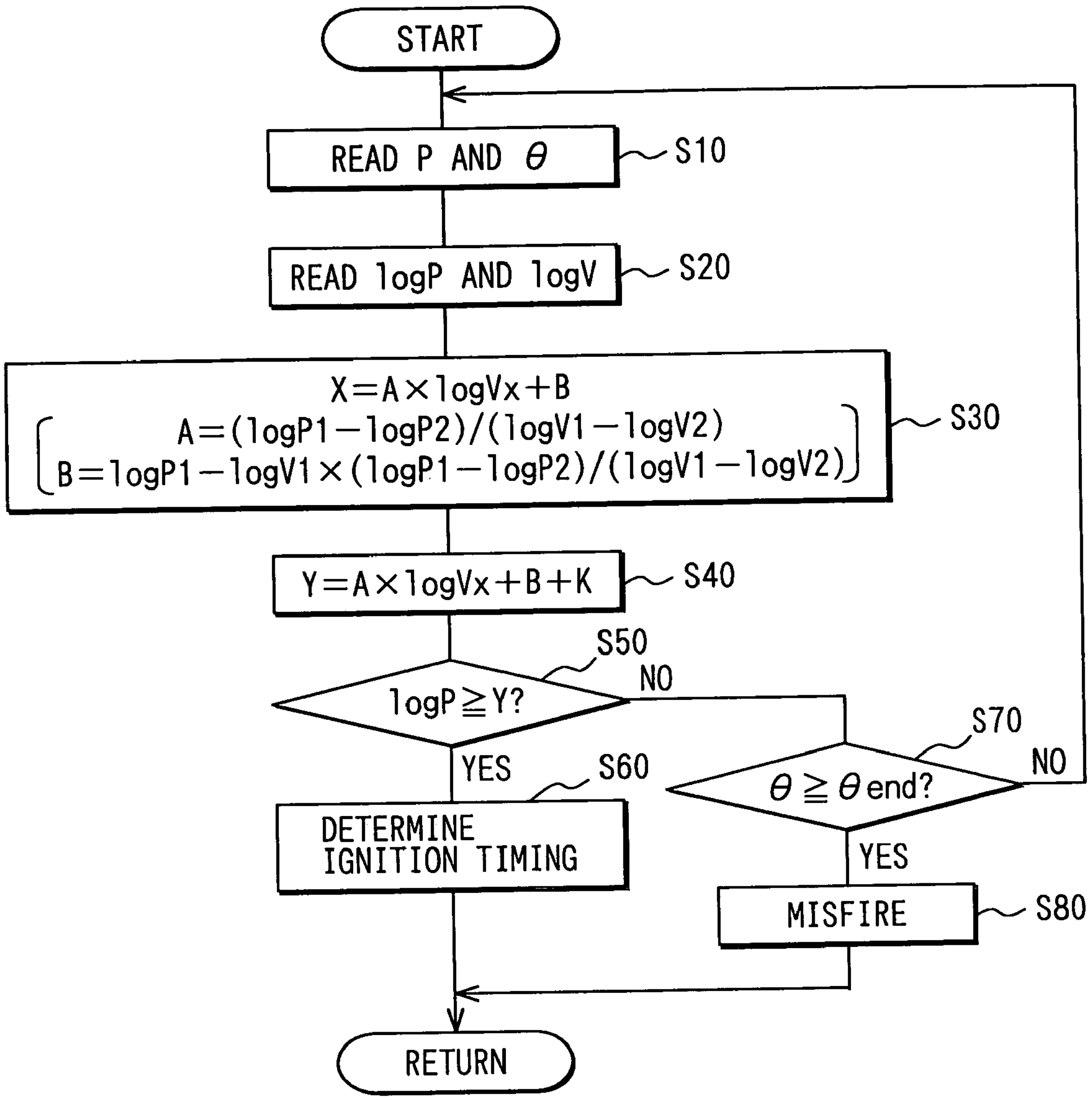
FIG. 5 is a flowchart showing a procedure of sensing an ignition timing.

FIG. 4 shows a construction of a diesel engine in accordance with a first embodiment of the present invention.

An internal combustion engine of the present embodiment is, for example, a multi-cylinder diesel engine 1 employing an accumulator fuel-injection system as shown in FIG. 4.

In this diesel engine 1, a piston 4 is received in a cylinder 3 formed in a cylinder block 2 and the motion of the piston 4 reciprocating in the cylinder 3 is transmitted as a rotational motion to the crankshaft (not shown) of the diesel engine 1 via a connecting rod 5.

To the top end surface of the cylinder block 2 is fixed a cylinder head 7 forming a combustion chamber 6 above the top of the piston 4. The cylinder head 7 has an intake port 8 and an exhaust port 9 which are open to the combustion chamber 6.

The intake port 8 and the exhaust port 9 are opened or closed by an intake valve 10 and an exhaust valve 11 which are respectively driven by cams (not shown).

An intake pipe 12 for sucking outside air via an air cleaner (not shown) is connected to the intake port 8 and when the piston 4 moves down in the cylinder 3 to produce a negative pressure in the cylinder in an intake stroke in which the intake valve 10 opens the intake port 8, the outside air sucked through the intake pipe 12 flows into the cylinder 3 through the intake port 8.

Moreover, an exhaust pipe 13 for exhausting the combustion gas is connected to the exhaust port 9 and the combustion gas pushed out of the combustion chamber 6 (cylinder) by the moving-up piston 4 is exhausted to the exhaust pipe 13 through the exhaust port 9 in an exhaust stroke in which the exhaust valve 11 opens the exhaust port 9.

An accumulator fuel-injection system is provided with a common rail 14 for accumulating fuel of a high pressure corresponding to an injection pressure, a fuel supply pump (not shown) for sending the high-pressure fuel to this common rail 14, an injector 15 for injecting the high-pressure fuel accumulated in the common rail 14 into the combustion chamber 6 of the diesel engine 1, and is controlled by an electronic control unit (referred to as ECU 16).

The common rail 14 accumulates the high-pressure fuel supplied by the fuel supply pump to a target rail pressure and supplies the accumulated high-pressure fuel to the injector 15 through a fuel pipe 17. The ECU 16 determines the target rail pressure of the common rail 14. Specifically, the operating state of the diesel engine 1 is detected by an accelerator position (engine load), an engine speed, and the like, and then a target rail pressure suitable for the operating state is set.

The injector 15 is provided with a solenoid valve electronically controlled by the ECU 16 and a nozzle for injecting fuel by the valve opening action of this solenoid valve and is fixed to the cylinder head 7 in a state where the tip of this nozzle is protruded into the combustion chamber 6.

The ECU 16 has sensor information sensed by various kinds of sensors (crank angle sensor 18, accelerator position sensor 19, fuel pressure sensor 20, cylinder pressure sensor 21, intake air pressure sensor 22, and the like) inputted thereto and controls the operating state of the diesel engine 1 on the basis of the information of these sensors.

The crank angle sensor 18 is disposed near a pulser 23 rotating in synchronization with the crankshaft of the diesel engine 1 and outputs a plurality of pulse signals corresponding to the number of teeth formed on the outer periphery of the pulser 23 while the pulser 23 rotates one along with the crankshaft. That is, the crank angle sensor 18 outputs a pulse signal for each predetermined crank angle (for example, 1° CA). A specific pulse signal is outputted as a TDC signal when the piston 4 reaches the top dead center in a compression stroke (compression top dead center: TDC). The ECU 16 measures the time interval of the pulse signals outputted from the crank angle sensor 18 to sense an engine speed NE.

The accelerator position sensor 19 senses the amount of operation (the amount of depression) of an accelerator pedal 24 operated by a driver and outputs it to the ECU 16.

The fuel pressure sensor 20 is fixed to the common rail 14 and senses the fuel pressure (actual rail pressure) accumulated in the common rail 14 and outputs it to the ECU 16.

The cylinder pressure sensor 21 is fixed to the cylinder head 7 and senses the cylinder pressure of the diesel engine 1 and outputs it to the ECU 16.

The intake air pressure sensor 22 is fixed to the intake pipe 12 and senses an intake air pressure in the intake pipe 12 and outputs it to the ECU 16.

The ECU 16 performs an injection pressure control and an injection quantity control on the basis of the above-described sensor information. The injection pressure control is such that controls the fuel pressure accumulated in the common rail 14 and feeds back the quantity of discharge of a fuel supply pump (pump discharge) in such a way that the actual rail pressure sensed by the fuel pressure sensor 20 agrees with a target rail pressure.

The injection quantity control is such that controls the quantity of injection and the injection timing of the fuel injected from the injector 15, and computes the optimum quantity of injection and the optimum injection timing according to the operating state of the diesel engine 1, and drives the solenoid valve of the injector 15 according to the computation result.

Further, the ECU 16 is provided with the function of ignition timing detecting means for detecting an ignition timing Tburn of the fuel so as to optimally control the ignition timing of the injector 15. This ignition timing detecting means is constructed to include the functions of cylinder pressure converting means, cylinder volume converting means, cylinder pressure waveform logarithm display means, motoring waveform estimating means, determination line computing means, and ignition timing determining means of the present invention.

Hereafter, a method of detecting the ignition timing Tburn by the ECU 16 (ignition timing detecting means) will be described with reference to a flowchart shown in FIG. 5 and FIGS. 1 to 3.

At step S10, the sensing value (cylinder pressure P) of the cylinder pressure sensor 21 at least from a compression stroke to a combustion and expansion stroke and the sensing value (crank angle θ) of the crank angle sensor 18 are read.

Figure 1A:
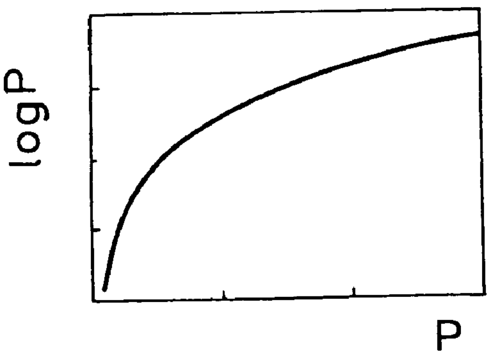
FIG. 1A is a conversion map for logarithmically converting a cylinder pressure according to a first embodiment.
Figure 1B:
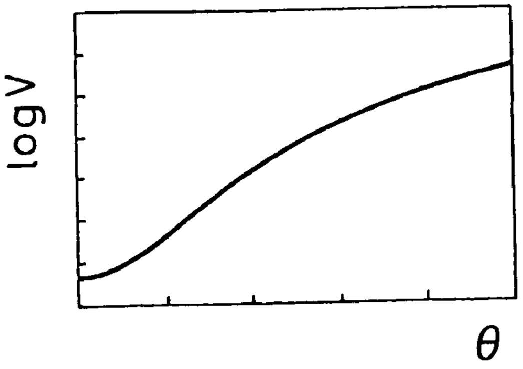
FIG. 1B is a conversion map for logarithmically converting a cylinder volume corresponding to a crank angle according to the first embodiment.
Figure 1C:
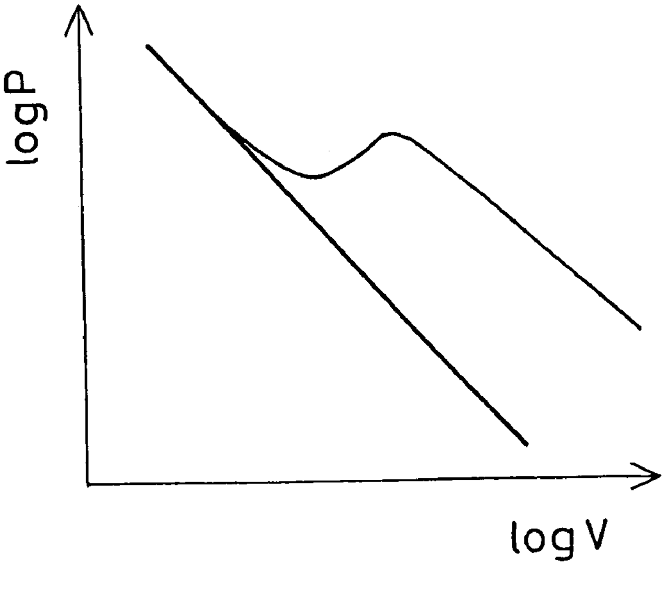
FIG. 1C is a graph showing a logarithmic conversion waveform expressed by a logarithm map according to the first embodiment.

At step S20, logarithmic values log P and log V corresponding to the cylinder pressure P and the crank angle θ from the compression stroke to the combustion and expansion stroke are read from a conversion map P and a conversion map V, respectively, and a cylinder pressure waveform which is logarithmically converted (hereafter referred to as logarithm conversion waveform) is made (displayed) in a logarithm map, as shown in FIG. 1C.

The conversion map P described at step S20, as shown in FIG. 1A, is a map for logarithmically converting the cylinder pressure P and stores logarithmic values log P corresponding to previously set pressures P. On the other hand, the conversion map V, as shown in FIG. 1B, is a map for logarithmically converting the cylinder volume V corresponding to the crank angle θ and stores logarithmic values log V corresponding to previously set crank angles θ.

The logarithm map, as shown in FIG. 1C, is a map having coordinate axes of the logarithmic value of the cylinder volume corresponding to the crank angle θ and the logarithmic value of the cylinder pressure P. By reading the logarithmic value log P and the logarithmic value log V in this logarithm map, a change in the cylinder pressure P from the compression stroke to the combustion and expansion stroke is displayed as a logarithm conversion waveform.

Figure 2:
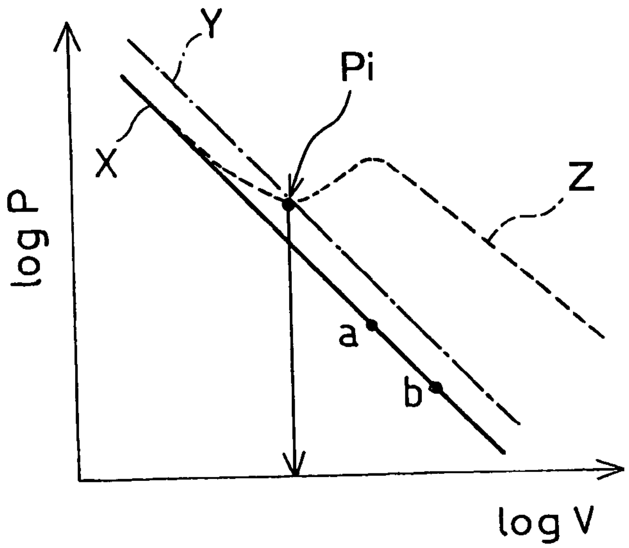
FIG. 2 is a graph showing a logarithmic conversion waveform expressed by a logarithm map related to the computation of a base line and a determination line according to the first embodiment.

At step S30, a base line X is calculated from the logarithm conversion waveform displayed in the logarithm map. This base line X shows a non-combustion cylinder pressure (motoring waveform) which is obtained by subtracting a pressure rise developed by cylinder combustion from the logarithm conversion waveform, that is, corresponds to a non-combustion state and is calculated by the following equation (1) on the basis of log P1, log V1 and log P2, log V2 at least at two previously set points (points “a” and “b” in the drawing), as shown in FIG. 2.

$$X = A \times \log Vx + B \tag{1}$$

$$A = (\log P1 - \log P2)/(\log V1 - \log V2)$$

$$B = \log P1 - \log V1 \times (\log P1 - \log P2)/(\log V1 - \log V2)$$

At step S40, a determination line Y for determining the ignition timing Tburn by the following equation (2) on the basis of the base line X calculated at step S30. This determination line Y can be found by moving the base line X in parallel by a threshold K in the direction of the vertical axis of the logarithm map (coordinate axis of a logarithmic value log P).

$$Y = A \times \log Vx + B + K \tag{2}$$

K: previously set threshold

At step S50, it is determined whether or not the logarithmic value log P read from the conversion map P at step S20 is larger than the determination line Y calculated at step S40. In other words, in the combustion cycle, it is determined whether or not a combustion waveform line Z that is continuous data of the logarithmic value log P read from the conversion map P at step S20 intersects the determination line Y.

Here, if it is determined that the following relationship (3) holds (determination result is YES), that is, the logarithmic value log P exceeds the determination line Y, the routine proceeds to the next step S60, and if it is determined that the following relationship (3) does not hold, that is, the logarithmic value log P does not exceed the determination line Y, the routine proceeds to step S70.

$$\log P \geqq Y \tag{3}$$

Figure 3A:
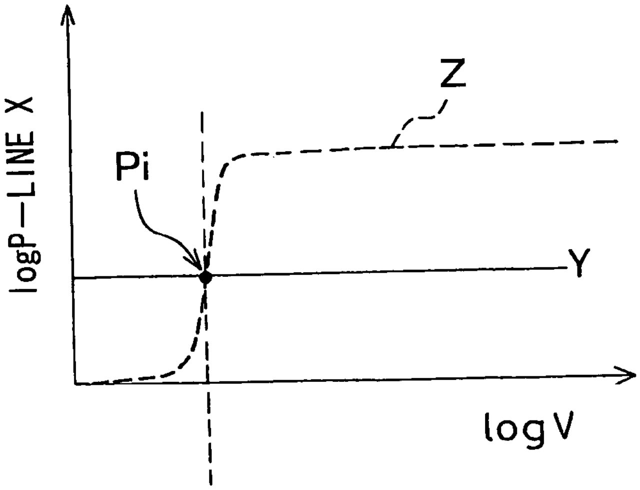
FIG. 3A is a map for finding a logarithmic value log V for an ignition timing and FIG. 3B is a conversion map for finding a crank angle corresponding to an ignition timing according to the first embodiment.
Figure 3B:
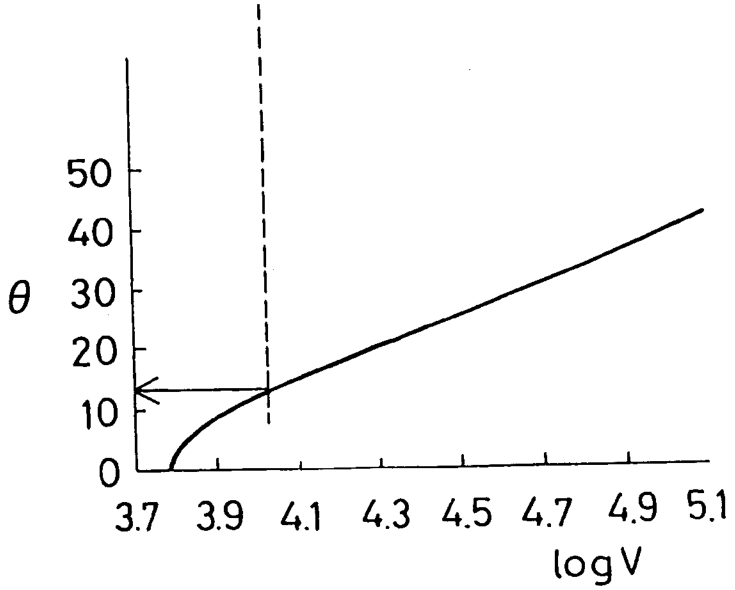

At step S60, the ignition timing is determined. Specifically, first, as shown in FIG. 3A, a logarithmic value log V is found from a point where the logarithmic value log P (the locus of continuous data of the logarithmic value log P is a combustion waveform line Z) agrees with the determination line Y. This point is a point Pi shown in FIG. 3A and it is determined that this point Pi is the ignition timing. In FIG. 2, a point Pi where the combustion waveform line Z (dotted line) intersects the determination line Y (single dot and dash line) is a point that is to be an ignition timing.

Here, the vertical axis of the graph shown in FIG. 3A indicates the logarithmic value log P when the base line X is put at a position of “0” of the vertical axis. In other words, the value of the vertical axis becomes “logarithmic value log P—vbase line X”. Next, from the conversion map V shown in FIG. 3B, a crank angle θ corresponding to the logarithmic value log V found in FIG. 3A is found and this crank angle θ is determined to be an ignition timing, whereby the present processing is finished.

At step S70, it is determined whether or not the crank angle θ read at step S10 is larger than a previously set ignition determination finishing timing (crank angle θend). Here, if the following relationship (4) holds (determination result is YES), the routine proceeds to the next step S80, and if the following relationship (4) does not hold (determination result is NO), the routine returns to step S10.

$$\theta \geqq \theta end \tag{4}$$

It is determined at step S80 that the diesel engine 1 is in the state of misfire because the crank angle θ read at step S10 exceeds the ignition determination finishing timing θend, and the present routine is finished.

[Effect of First Embodiment]

In the first embodiment, the cylinder pressure P and the cylinder volume V corresponding to the crank angle θ at least from the compression stroke to the combustion and expansion stroke are converted to the logarithmic value log P and the logarithmic value log V from the conversion map P and the conversion map V, respectively, and the logarithmic value log P and the logarithmic value log V are read from the logarithm maps, whereby a change in the cylinder pressure P from the compression stroke to the combustion and expansion stroke can be expressed as a logarithmic conversion waveform. This logarithmic conversion waveform is expressed by a straight line having a given gradient before a pressure rise developed by combustion in the cylinder starts, that is, while the cylinder pressure P varies according to only the motion of the piston 4. Therefore, the motoring waveform can be easily estimated from the logarithmic conversion waveform by a linear approximation method.

Entering into details, the motoring waveform can be expressed by a straight line having a given gradient by logarithmically converting the cylinder pressure P and the cylinder volume V corresponding to the crank angle θ, and a parallel line shifted in parallel by a predetermined value K to this straight line is made a threshold as the determination line Y. Hence, a point of intersection of this determination line Y and the combustion waveform line Z changing irregularly can be obtained with stability. As a result, it is possible to produce an excellent result of detecting the ignition timing with high accuracy while reducing the computation load.

Further, according to this method, it is possible to estimate the motoring waveform without using the polytropic equation that requires an exponential calculation and hence to reduce the computation load.

Still further, according to the method of sensing the ignition timing described in the first embodiment, a conventional method of searching a map for a polytropic exponent n according to the operating state of the internal combustion engine, or variations in the internal combustion engines is not employed but the logarithmic conversion waveform is found for each combustion cycle of the diesel engine 1 and the motoring waveform is estimated from the found logarithmic conversion waveform. Hence, the motoring waveform is not affected by a change in the operating state of the diesel engine 1, in particular, a change in the variations in the diesel engines 1. As a result, it is possible to estimate the motoring waveform for each combustion cycle with high accuracy and hence to improve the sensing accuracy of the ignition timing.

[Second Embodiment]

In this second embodiment, one example will be described in which a plurality of injections are sprayed during one combustion stroke, for example, the second injection is sprayed after the first injection and in which an ignition timing Tburn to the second injection is sensed.

Figure 6A:
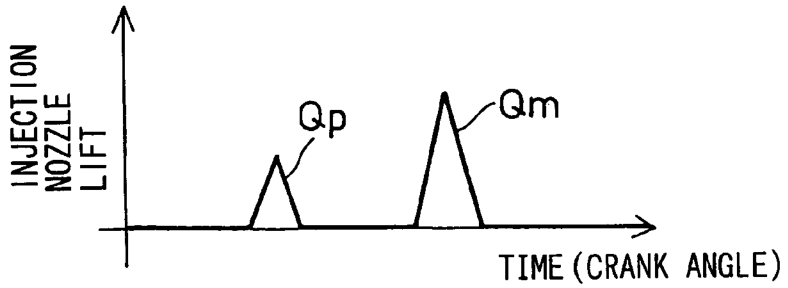
FIG. 6A is a graph showing an injection pattern when a plurality of injections are sprayed during one combustion stroke.
Figure 6B:
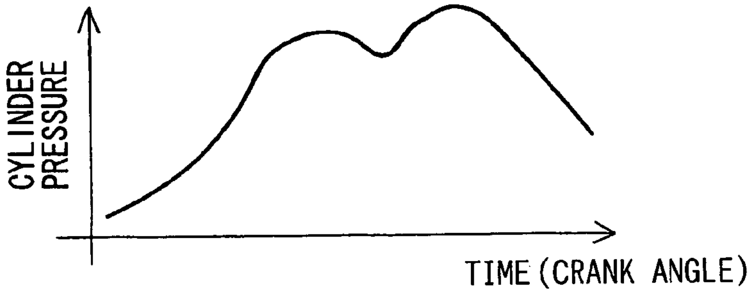
FIG. 6B is a graph of a cylinder pressure waveform showing a change in the cylinder pressure developed by the plurality of injections according to a second embodiment.
Figure 7:
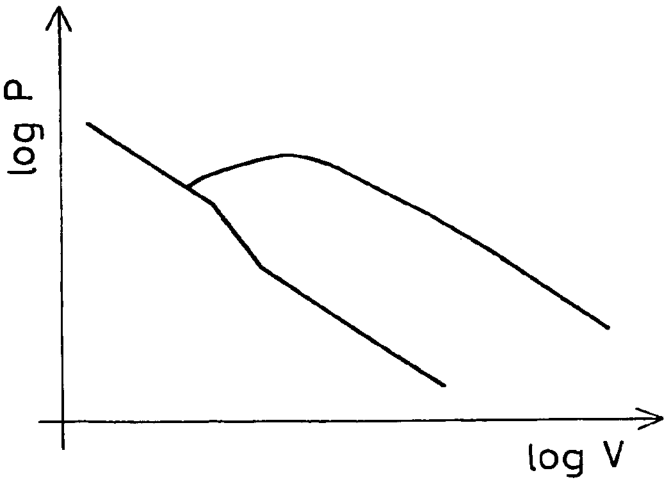
FIG. 7 is a graph showing a logarithmic conversion waveform corresponding to a plurality of injections according to the second embodiment.

For example, as shown in FIG. 6A, when the second injection or a main injection Qm is sprayed after the first injection or a pilot injection Qp, as shown in FIG. 6B, a pressure rise developed by the combustion of the main injection Qm occurs after a pressure rise developed by the combustion of the pilot injection Qp and hence a logarithmic conversion waveform varies in the manner shown in FIG. 7. In this case, when the determination line Y of the ignition timing Tburn to the main injection Qm (second injection) is computed by using the motoring waveform as the base line X as described in the first embodiment, the determination line varies for each combustion cycle because of the effect (variations) of the pilot injection Qp (first injection), which results in presenting a problem that the ignition timing Tburn for the main injection Qm cannot be determined with high accuracy.

Figure 8:
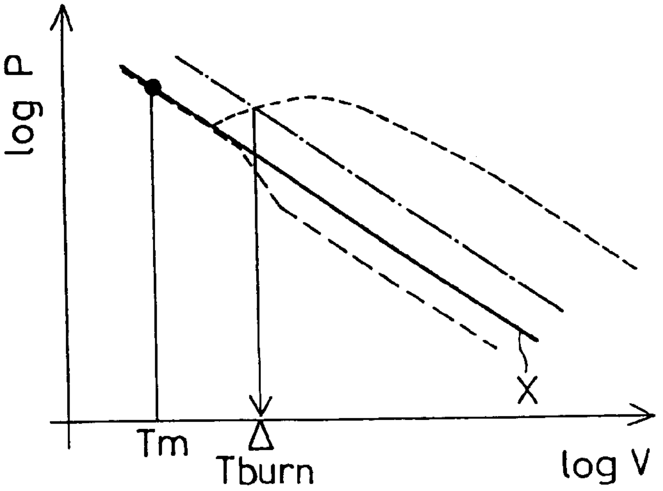
FIG. 8 is a graph showing a logarithmic conversion waveform relating to a method of correcting a base line according to the second embodiment.

Hence, the base line X is corrected according to a command injection timing Tm for the main injection Qm and the determination line Y is computed on the basis of the corrected base line X. Specifically, as shown in FIG. 8, the base line X is corrected so as to pass the logarithmic value log P at the command injection timing Tm for the main injection Qm. With this, the base line X can be set (corrected) without being affected by the pilot injection Qp. Hence, by computing the determination line Y on the basis of the corrected base line X, the ignition timing Tburn for the main injection Qm can be sensed with high accuracy.

Further, as another example of sensing the ignition timing Tburn for the second injection, it is also recommendable to correct the base line X according to the combustion finishing timing of the first injection. Specifically, the base line X is corrected so as to pass the logarithmic value log P at the combustion finishing timing of the first injection (pilot injection Qp in the above-described example). The logarithmic conversion waveform is linearly approximated by the use of the logarithmic value log P at the combustion finishing timing of the first injection and the logarithmic value log P at the command injection timing Tm for the second injection (main injection Qm in the above-described example). Hence, by correcting the base line X so as to pass the logarithmic value log P at the combustion finishing timing of the first injection and by computing the determination line Y on the basis of the corrected base line X, the ignition timing Tburn for the main injection Qm can be sensed with high accuracy.

In this regard, the method described in this second embodiment can be applied to not only a case where two injections (the first injection and the second injection) are sprayed during one combustion stroke but also a case where a plurality of (three or more) injections are sprayed during one combustion stroke and where the plurality of (three or more) injections include the first injection and the second injection.

Further, the examples of the first injection and the second injection may include not only the pilot injection Qp and the main injection Qm but also, for example, the main injection Qm, or the first injection and a post injection Qpost, or the second injection after the main injection Qm.

[Third Embodiment]

In this third embodiment, a method of determining a combustion finishing timing will be described.

Figure 9:
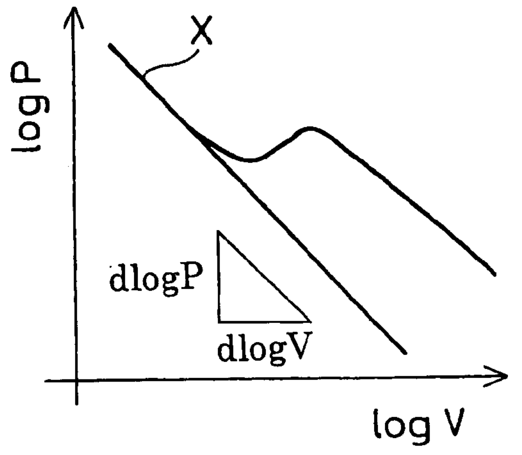
FIG. 9 is a graph showing a logarithmic conversion waveform relating to a method of determining a combustion finishing timing according to a third embodiment.
Figure 10:
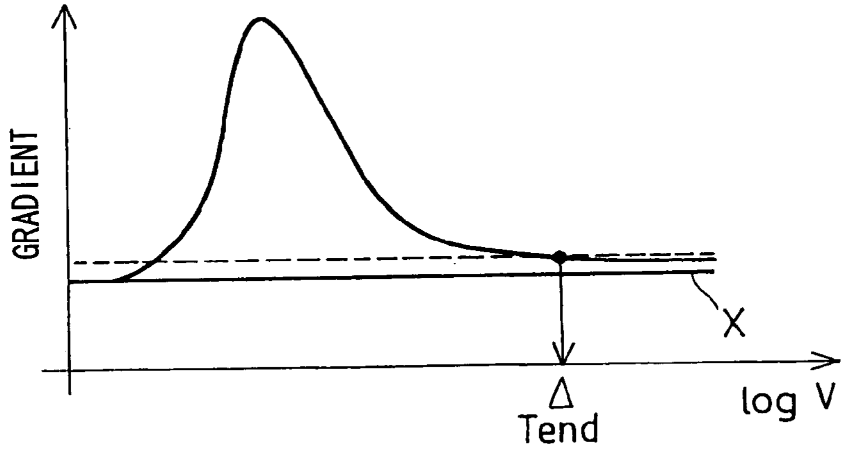
FIG. 10 is a graph showing a relationship between the gradient of a logarithmic conversion waveform and a combustion finishing timing according to the third embodiment.

As described in the first embodiment, before a pressure rise developed by combustion in the cylinder starts, that is, while the cylinder pressure P changes according to only the motion of the piston 4, $PV^n$=constant (where P is cylinder pressure and V is cylinder volume and n is polytropic exponent). For this reason, the logarithmic conversion waveform (motoring waveform) shown in the logarithm map, as shown in FIG. 9, is expressed by a straight line having a given gradient. Here, when the gradient of the logarithmic conversion waveform to the logarithmic value log V is expressed by a graph, as shown in FIG. 10 (the vertical axis is gradient and the horizontal axis is logarithmic value log V), the motoring waveform (base line X described in the first embodiment) is expressed by a straight line having a constant gradient and parallel to the horizontal axis in the drawing.

Thereafter, when combustion occurs in the cylinder, a combustion pressure increases and the gradient of the logarithmic conversion waveform also increases rapidly to show a maximum value and then the combustion pressure decreases and the gradient of the logarithmic conversion waveform also decreases and converges on a constant value according to the above-described relationship of $PV^n$=constant.

Hence, to determine the combustion finishing timing, as shown in FIG. 9, when the quantity of change in the logarithmic value log P is expressed by d log P and the quantity of change in the logarithmic value log V is expressed by d log V and the d log P and the d log V are expressed by the following equations (5) and (6) (where i=natural integer), the gradient of the logarithmic conversion waveform is computed by the following equation (7).

$$d \log P = \log P(i) - \log P(i-1) \quad (5)$$

$$d \log V = \log V(i) - \log V(i-1) \quad (6)$$

$$d \log P / d \log V \quad (7)$$

The ECU 16 has a function of means for determining the combustion finishing timing in accordance with the present invention and determines that a timing when the gradient of the logarithmic conversion waveform computed by the above equation (7) becomes nearly constant after the combustion starts is a combustion finishing timing Tend (see FIG. 10).

The determination of the combustion finishing timing Tend can be applied also when the combustion finishing timing of the first injection described in the above second embodiment is determined.

[Fourth Embodiment]

In this fourth embodiment, a method of computing the quantity of combustion in one combustion stroke in the diesel engine 1 will be described.

The quantity of combustion in one combustion stroke correlates to the product of the cylinder pressure P and the cylinder volume V. Hence, the quantity of combustion can be computed by finding the product of the cylinder pressure P and the cylinder volume V. The computation of the quantity of combustion is performed by the ECU 16 having a function of means for computing the quantity of combustion in accordance with the present invention.

Figure 11:
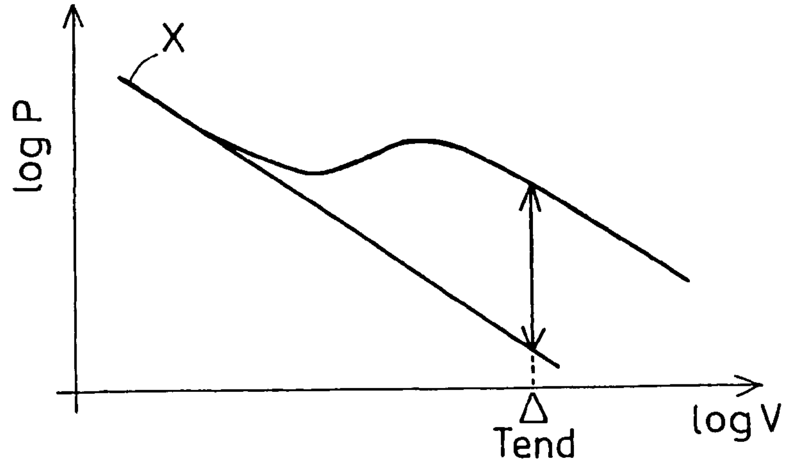
FIG. 11 is a graph showing a logarithmic conversion waveform relating to a method of computing the quantity of combustion according to a fourth embodiment.

Specifically, a shown in FIG. 11, in a case where the motoring waveform is the base line X, when the quantity of increase in the logarithmic value log P after a predetermined hour from the combustion finishing timing or the ignition timing Tburn is expressed as Δ log P to this base line X, the quantity of combustion is computed by the following equation (8).

$$\text{The quantity of combustion} = \Delta \log P + \log V \quad (8)$$

In the first embodiment to the fourth embodiment, methods of sensing the ignition timing Tburn, determining the combustion finishing timing, and computing the quantity of combustion on the basis of the logarithmic conversion waveform have been described. However, the logarithmic conversion waveforms described in the embodiments are strictly for the purpose of examples and, for example, when a combustion pattern varies according to an injection timing, the quantity of combustion, and the number of injections, needless to say, the logarithmic conversion waveforms also varies according to them.

Here, the logarithmic conversion waveforms according to various combustion patterns are shown in FIG. 12 to FIG. 14. FIGS. 12A to 12D show the injection nozzle lift of the injector 15, and FIGS. 13A to 13E show the cylinder pressure waveform showing a change in the actual cylinder pressure according to the crank angle θ, and FIGS. 14A to 14E show the logarithmic conversion waveform.

Figure 12A:
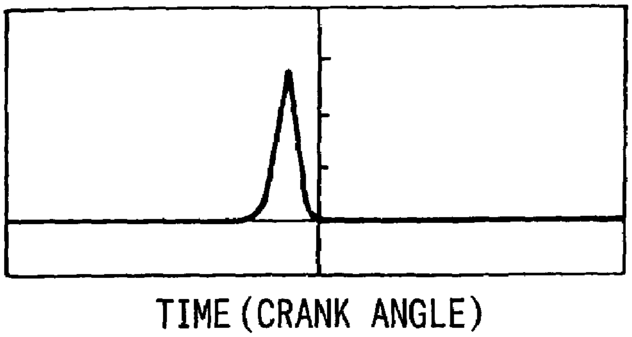
FIGS. 12A to 12D show injection nozzle lift relating to various kinds of combustion patterns.
Figure 13A:
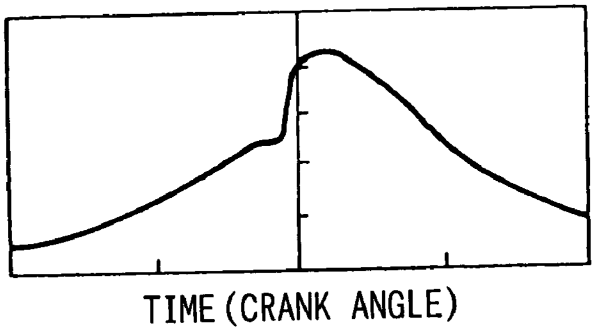
FIGS. 13A to 13E are graphs showing cylinder pressure waveforms.
Figure 14A:
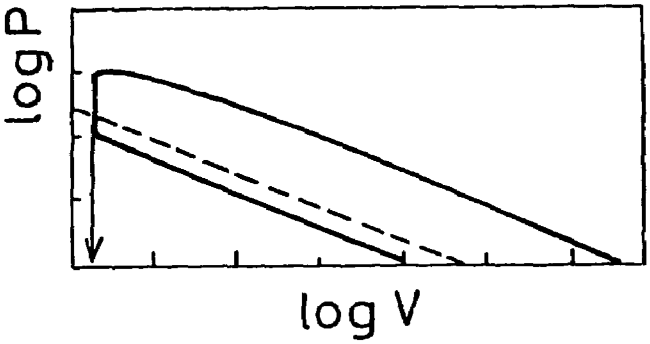
FIGS. 14A to 14E are graphs showing logarithmic conversion waveforms.

FIGS. 12A, 13A, and 14A show a case where one injection is sprayed during one combustion stroke and is an example when the injection nozzle lift is performed a little before the TDC.

Figure 12B:
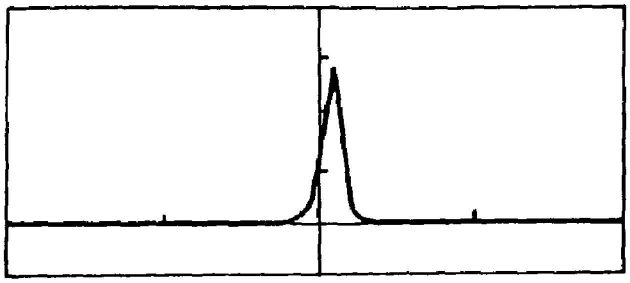
Figure 13B:
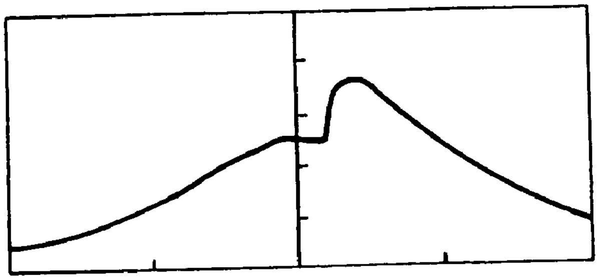
Figure 14B:
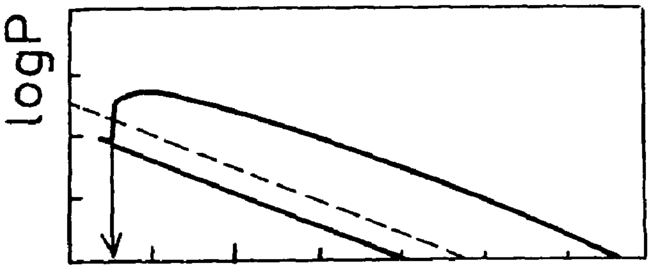

FIGS. 12B, 13B, and 14B similarly show a case where one injection is sprayed during one combustion stroke and is an example when the injection nozzle lift is performed a little after the TDC.

Figure 12C:
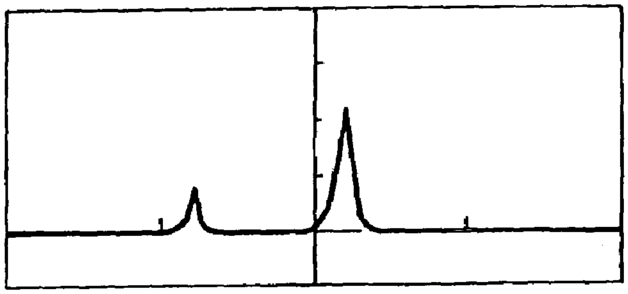
Figure 13C:
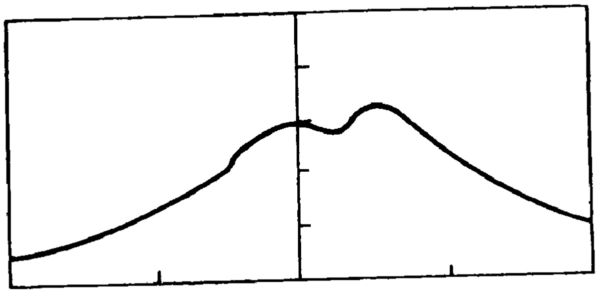
Figure 14C:
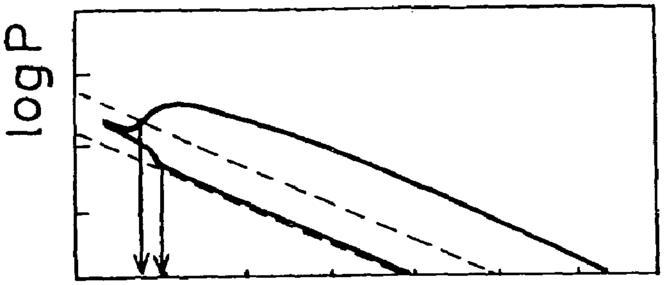

FIGS. 12C, 13C, and 14C show a case where two injections (for example, the pilot injection Qp and the main injection Qm) are sprayed during one combustion stroke and is an example when the injection nozzle lift relating to the pilot injection Qp is performed a little before the TDC and when the injection nozzle lift relating to the main injection Qm is performed a little after the TDC.

Figure 12D:
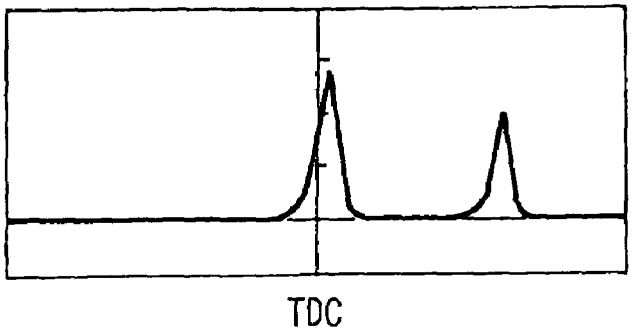
Figure 13D:
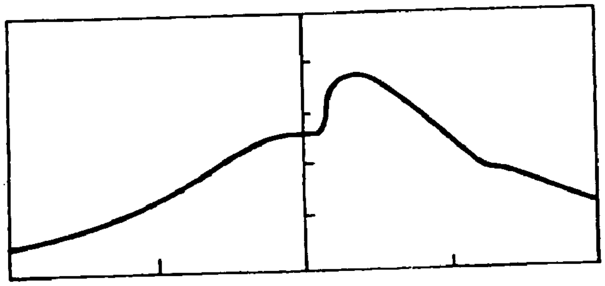
Figure 14D:
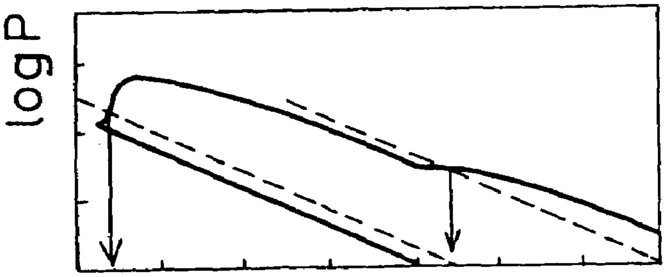

FIGS. 12D, 13D, and 14D similarly show a case where two injections (for example, the main injection Qm and the post injection Qpost) are sprayed during one combustion stroke and is an example when the injection nozzle lift relating to the main injection Qm is performed nearly at the position of the TDC and when the injection nozzle lift relating to the post injection Qpost is performed a little after the TDC.

Figure 13E:
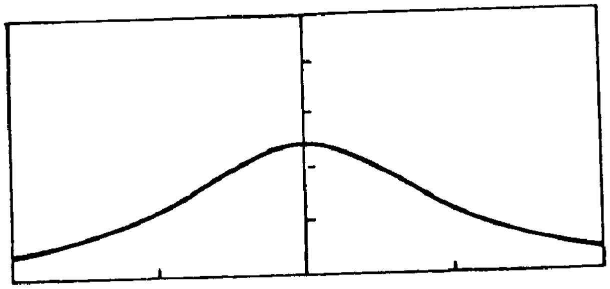
Figure 14E:
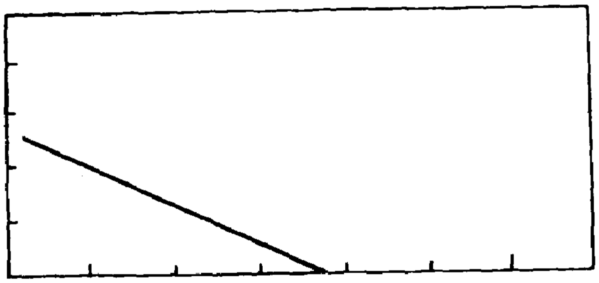

FIGS. 13E and 14E show motoring waveforms when there is no injection nozzle lift, that is, when fuel injection is not conducted. In this case, as described in the first embodiment, the logarithmic conversion waveform is shown by a straight line having a given gradient.

[Fifth Embodiment]

In the first embodiment, a method of sensing the ignition timing Tburn of fuel on the basis of information obtained from the cylinder pressure sensor 21 and the crank angle sensor 18 has been described. However, when an error is caused in the sensing value of the crank angle sensor 18 by the position where the crank angle sensor 18 is mounted and the variations in the engines, the sensing accuracy of the ignition timing Tburn is inevitably affected by the error.

Hence, in this fifth embodiment, a method of sensing a more correct compression top dead center (TDC) on the basis of the sensing value of the cylinder pressure sensor 21 will be described.

Figure 15:
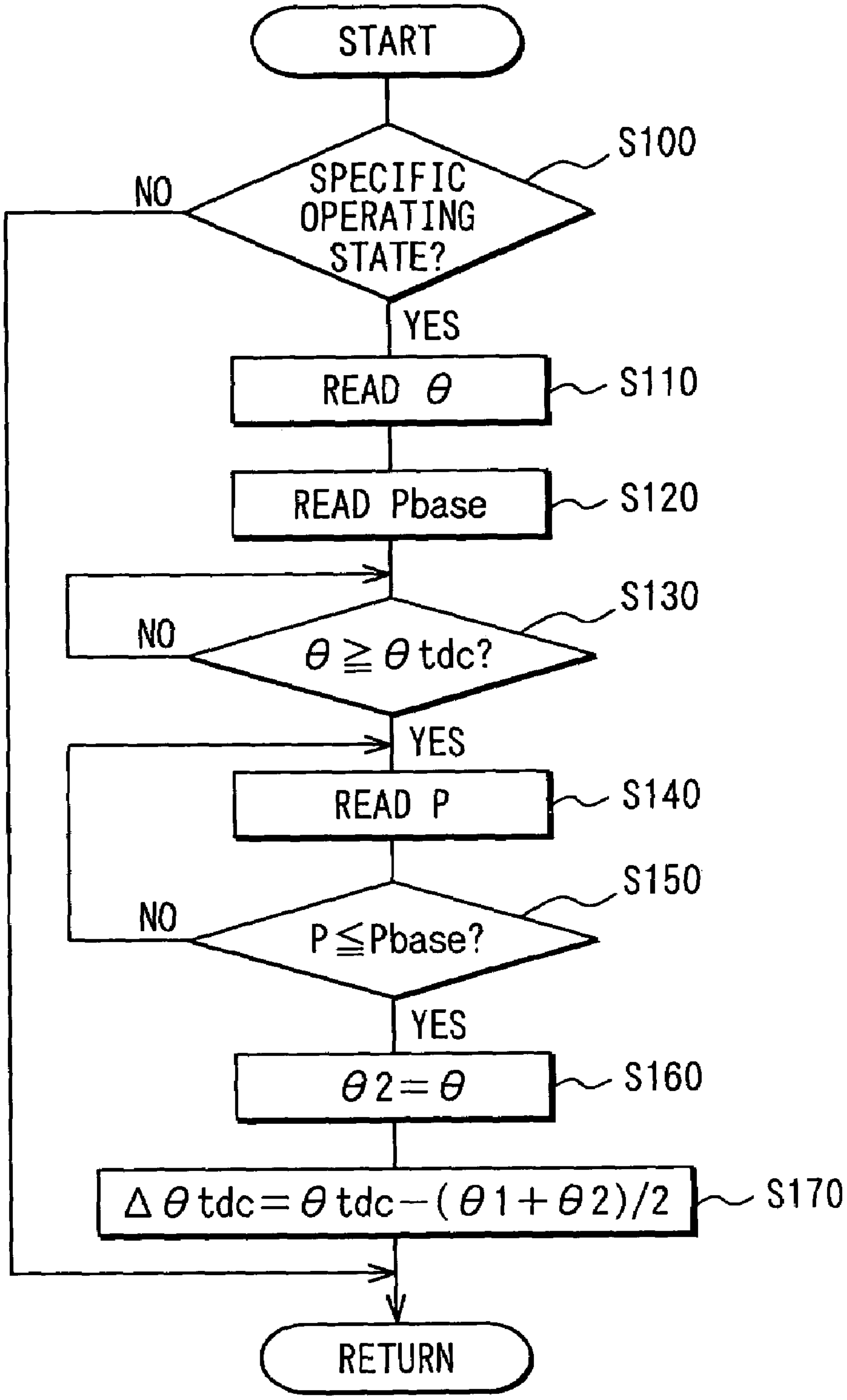
FIG. 15 is a flowchart showing a procedure of sensing a TDC according to a fifth embodiment.

The ECU 16 is provided with a function of means for sensing a compression top dead center. Hereafter, a method of sensing a compression top dead center by the ECU 16 (means for sensing a compression top dead center) will be described on the basis of a flowchart shown in FIG. 15.

At step S100, it is determined whether or not an operating state to sense a compression top dead center holds. The sensing of a compression dead center is performed in a specific operating state where the cylinder pressure P varies according to only the reciprocating motion of the piston 4 without being affected by the combustion pressure by combustion in the cylinder.

The above-described “specific operating state” means, for example, a state of non-combustion where fuel injection is cut when a vehicle speed is decreased or the like, or a state where a combustion starting timing in the cylinder 3 is delayed more than usual.

When the determination result at this step S100 is YES, that is, when the specific operating state holds, the routine proceeds to the next step 110 and when the determination result is NO, the present processing is finished.

At step S110, the sensing value (crank angle θ) of the crank angle sensor 18 is read.

Figure 16:
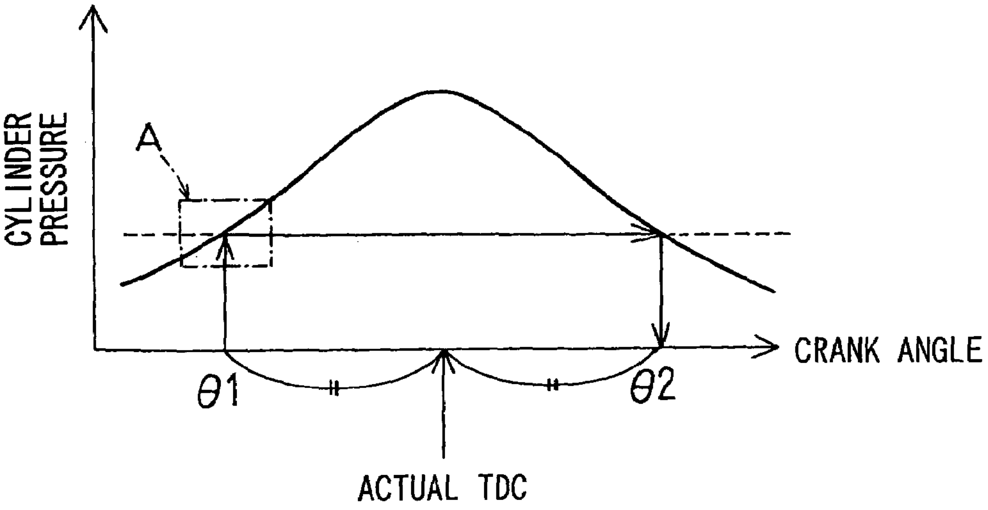
FIG. 16 is a graph showing a cylinder pressure waveform relating to a TDC according to the fifth embodiment.
Figure 17:
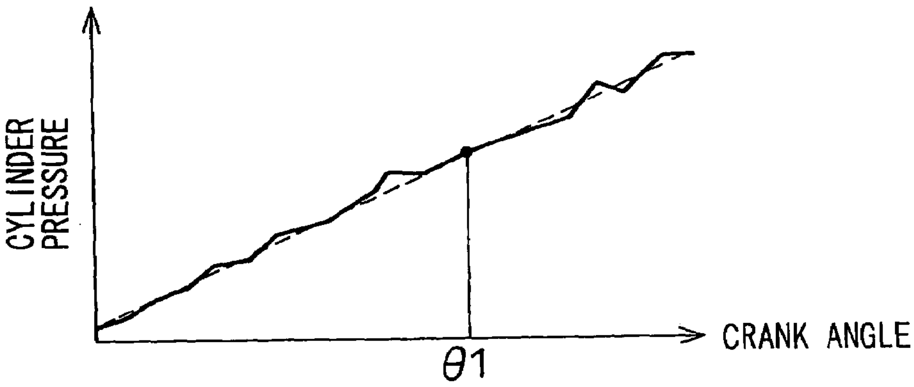
FIG. 17 is a graph showing a cylinder pressure waveform showing a region where a rate of change in the cylinder pressure is large according to the fifth embodiment.

At step S120, when the piston 4 moves up in the cylinder 3, the sensing value (referred to as base pressure "Pbase") in the cylinder pressure sensor 21 sensed at a certain base crank angle (referred to as "base angle θ1") is read. Here, as shown in FIG. 16 and FIG. 17, the base angle θ1 is set in a region where a rate of change (a rate of increase) of the cylinder pressure P is large, that is, in a region where the cylinder pressure P increases largely with respect to the crank angle θ (for example, 10° CA before the TDC). Here, FIG. 17 is an enlarged view of an "A" portion in FIG. 16 and shows a cylinder pressure waveform near the base angle θ1.

At step S130, it is determined whether or not the crank angle θ is larger than a crank angle θtdc at the TDC. Here, when the following relationship (9) holds (determination result is YES), that is, when the crank angle θ is larger than the crank angle θtdc at the TDC, the routine proceeds to the next step S140, and when the following relationship (9) does not hold (determination result is NO), step S130 is repeatedly executed until the following relationship (9) holds.

$$\theta \geqq \theta tdc \quad (9)$$

At step S140, the sensing value (cylinder pressure P) of the cylinder pressure sensor 21 is read.

At step S150, it is determined whether or not the base pressure Pbase read at step S120 is not less than the cylinder pressure P read at step S140. Here, when the following relationship (10) holds (determination result is YES), that is, when the cylinder pressure P is less than the base pressure Pbase, the routine proceeds to the next step S160 and when the following relationship (10) does not hold (determination result is NO), the routine return to step S140.

$$P \leqq \text{Pbase} \quad (10)$$

At step S160, a crank angle (referred to as "an objective angle θ2") when the cylinder pressure P becomes equal to the base pressure Pbase is sensed.

At step S170, the quantity of error of TDC (Δθtdc) is computed. Here, as shown in FIG. 16, a middle point of the base angle θ1 and the objective angle θ2 is assumed as a real TDC and a difference between the real TDC and the crank angle θtdc at the TDC sensed by the crank angle sensor 18 is computed as the quantity of error of TDC (Δθtdc). Specifically, the quantity of error of TDC (Δθtdc) is computed by the following equation (11).

$$\Delta\theta tdc = \theta tdc - (\theta 1 + \theta 2)/2 \quad (11)$$

[Effect of Fifth Embodiment]

In this fifth embodiment, the base angle θ1 is set in a region where the cylinder pressure P increases largely with respect to the crank angle θ (for example, 10° CA before the TDC) and a middle point of this base angle θ1 and the objective angle θ2 is sensed as a TDC. Hence, as compared with the publicly known technology described in JP-11-210546A, the sensing error of the cylinder pressure sensor 21 caused by the effect of noises can be reduced and hence the TDC can be sensed more correctly.

[Sixth Embodiment]

Figure 18:
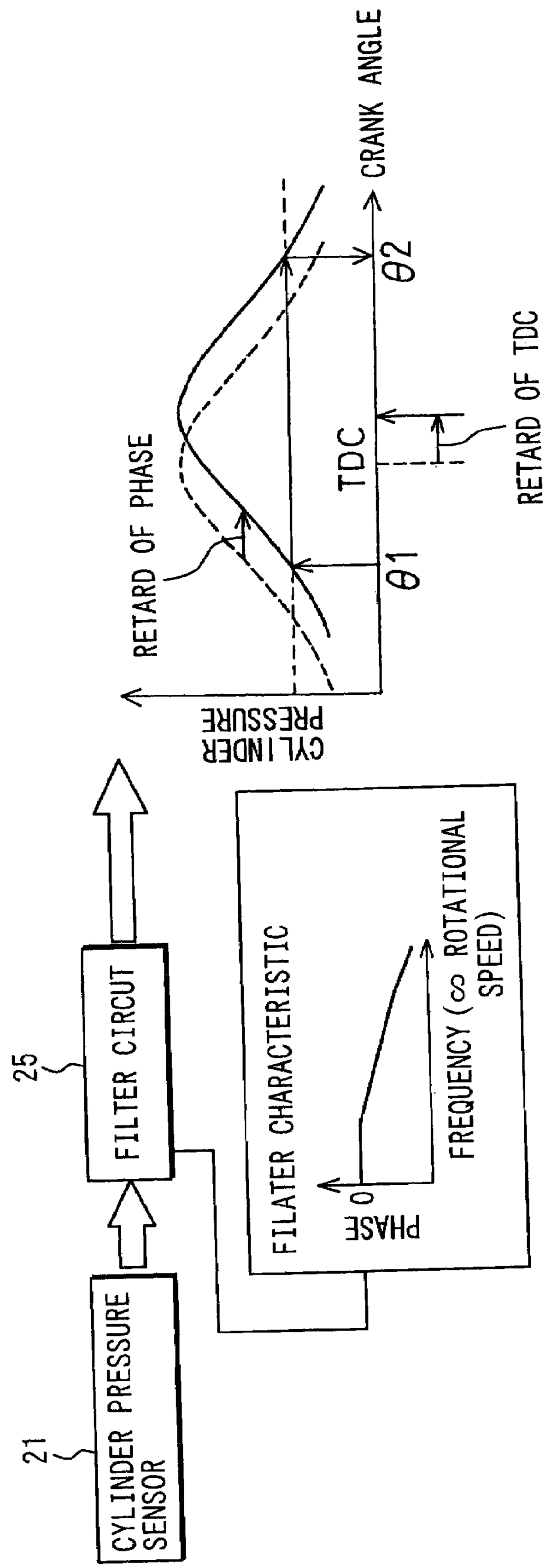
FIG. 18 is a graph showing a cylinder pressure waveform showing a phase delay caused by a filtering processing according to a sixth embodiment.

There is a case where when the sensing value (analog signal) of a cylinder pressure sensor 21 is inputted through a filter circuit 25, as shown in FIG. 18, in the method of sensing a TDC described in the fifth embodiment, a phase delay is caused by the filter characteristics of the filter circuit 25. In this case, when the TDC is sensed on the basis of the signal (cylinder pressure P) delayed in phase, there is inevitably caused an error between a real TDC and the detected TDC (the quantity of delay in phase caused by a filtering processing).

Hence, in this sixth embodiment, the TDC is sensed by the use of a signal of another system that is not processed by the filer circuit 25. That is, when the ECU 16 senses a TDC, the ECU 16 reads an analog signal outputted from the cylinder pressure sensor 21 without filtering the analog signal and senses the TDC by the use of the analog signal that is not subjected to the filtering processing. With this, a real TDC can be sensed without causing a delay in phase.

[Seventh Embodiment]

In the above sixth embodiment, a method of sensing a TDC by the use of a signal of another system that is not processed by the filter circuit 25 has been described. However, even when a TDC is sensed by the use of a signal subjected to the filtering processing, by removing the quantity of delay in phase caused by the filtering processing, a TDC can be correctly sensed. In this seventh embodiment, this method will be described.

In general, the characteristic of the filter circuit 25 has a tendency that the higher the frequency of a signal processed by the filter circuit 25, the larger the quantity of shift (delay) in phase (see FIG. 18).

Figure 19:
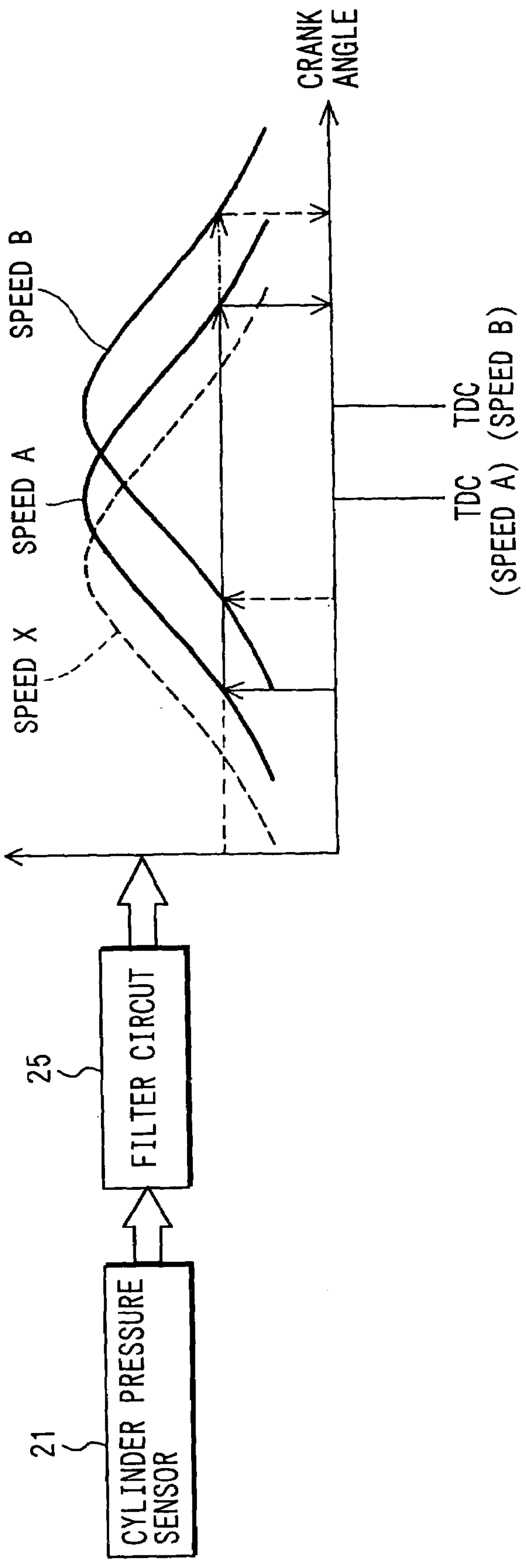
FIG. 19 is a graph showing a cylinder pressure waveform showing a phase delay caused by a filtering processing according to a seventh embodiment.

The frequency of signal of the cylinder pressure P used for sensing a TDC is proportional to an engine speed. Hence, TDCs are sensed at different engine speeds, for example, as shown in FIG. 19, at the first engine speed A and the second engine speed B, to compute the quantity of delay caused by the filtering processing.

Figure 20:
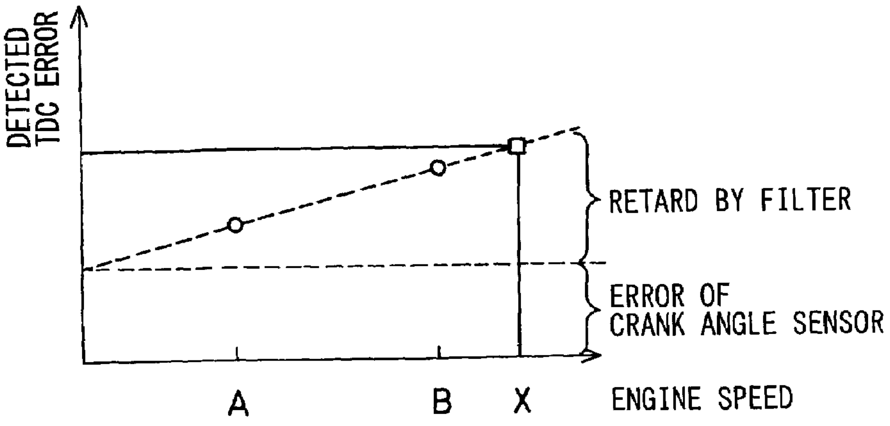
FIG. 20 is a graph showing a relationship between an engine speed and the sensing error of a TDC according to the seventh embodiment.
Figure 21A:
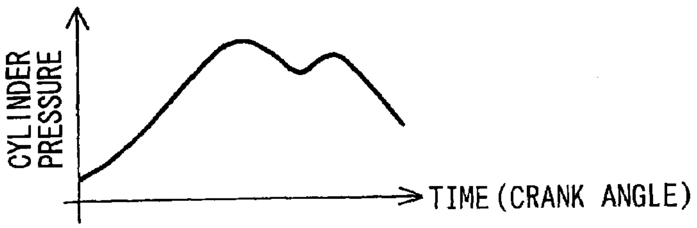
FIG. 21A PRIOR ART
FIG. 21A is a graph showing a cylinder pressure waveform at the time of combustion.
Figure 21B:
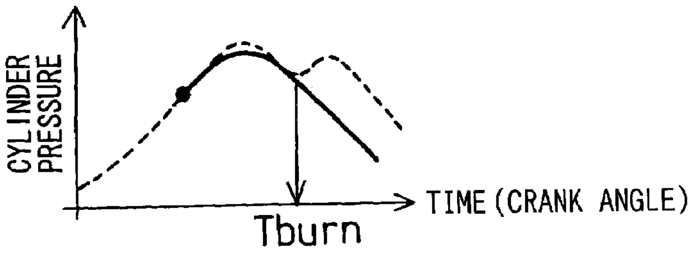
FIG. 21B PRIOR ART
FIG. 21B is a graph showing a motoring waveform.
Figure 21C:
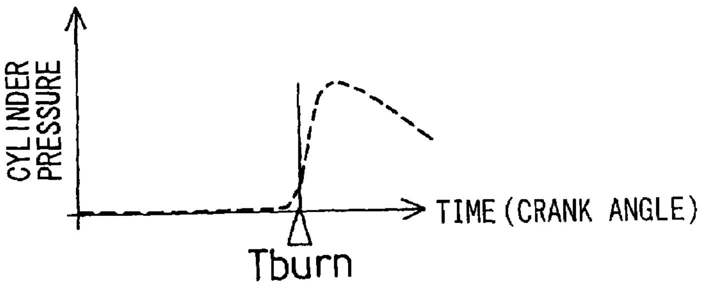
FIG. 21C PRIOR ART
FIG. 21C is a graph showing a combustion pressure waveform relating to the determination of an ignition timing (prior art)
Figure 22:
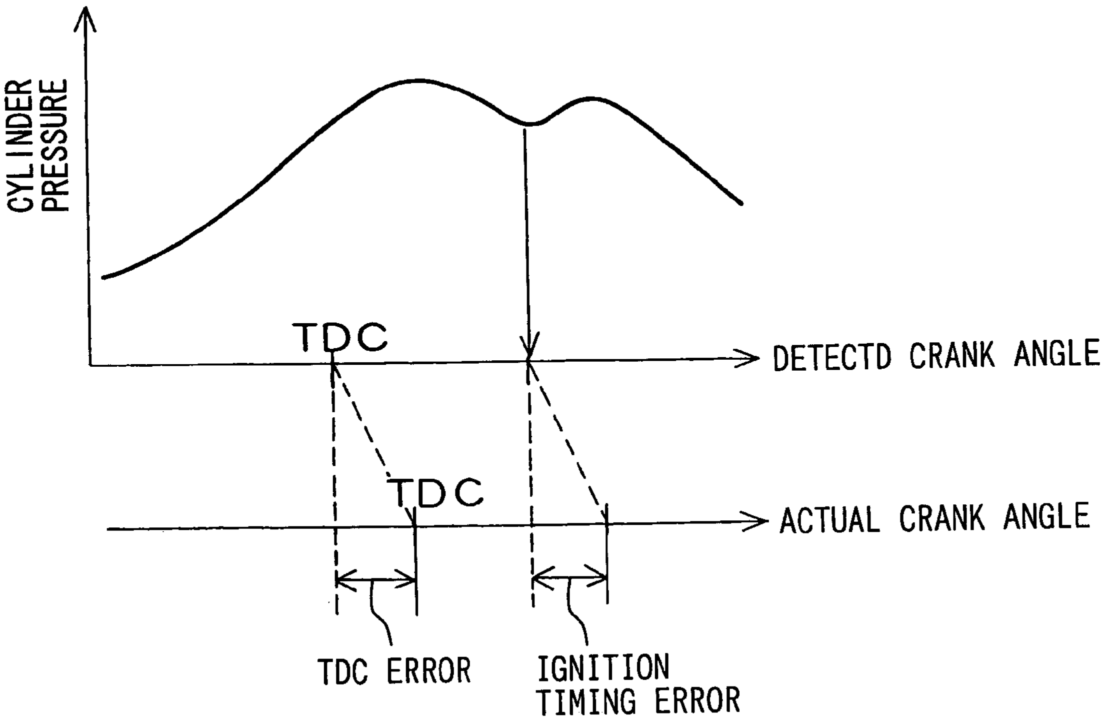
FIG. 22 PRIOR ART
FIG. 22 is a graph showing a cylinder pressure waveform at the time of combustion relating to the sensing of an ignition timing (prior art)
Figure 23:
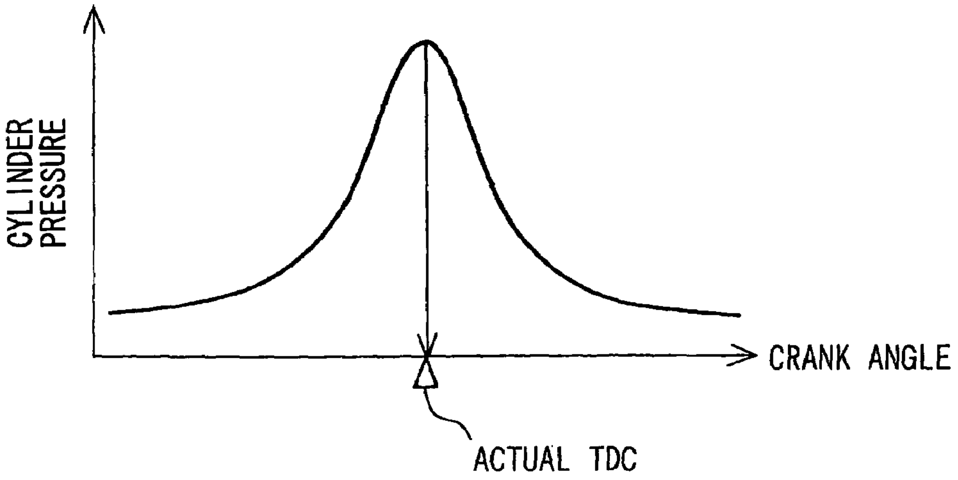
FIG. 23 PRIOR ART
FIG. 23 is a graph showing a cylinder pressure waveform at the time of non-combustion relating to the sensing of a TDC (prior art)
Figure 24:
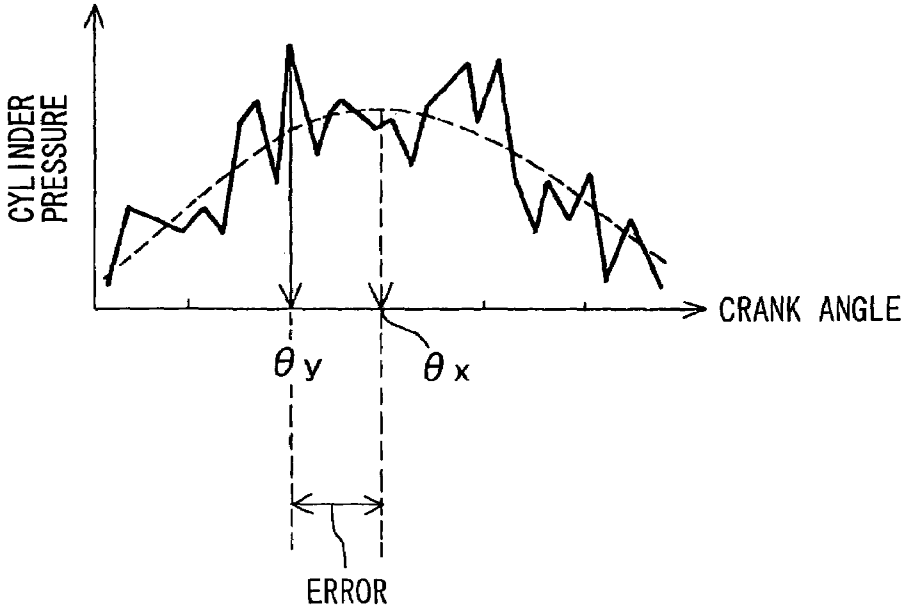
FIG. 24 PRIOR ART
FIG. 24 is a graph showing a cylinder pressure waveform near a TDC showing the effect of noises (prior art).

Specifically, the filter characteristic (correlation between the frequency of the signal and the phase delay) is obtained from the TDC sensed at the first engine speed A and the TDC sensed at the second engine speed B, whereby the quantity of delay according to the filter characteristic at an engine speed X can be found. According to this method, as shown in FIG. 20, the quantity of delay of the filter varying along with the engine speed (frequency) can be separated from the quantity of error of the TDC. Therefore, it is possible to sense the error of the TDC with high accuracy and to estimate the quantity of delay caused by the filtering processing and hence to sense the ignition timing Tburn with high accuracy.

What is claimed is:

1. A controller for an internal combustion engine comprising:

a cylinder pressure sensor for sensing a cylinder pressure representing a pressure in a cylinder of the internal combustion engine;

a crank angle sensor for sensing a crank angle representing a crank position of the internal combustion engine; and an ignition timing sensing means for sensing an ignition timing of the internal combustion engine on the basis of information obtained from the cylinder pressure sensor and the crank angle sensor, wherein the ignition timing sensing means includes:

a cylinder pressure converting means that has a conversion map P for logarithmically converting a previously set pressure and converts such a cylinder pressure at least from a compression stroke to a combustion and expansion stroke that is sensed by the cylinder pressure sensor to a logarithmic value log P by the conversion map P;

a cylinder volume converting means that has a conversion map V for logarithmically converting a cylinder volume corresponding to a previously set crank angle and converts such a cylinder volume at least from a compression stroke to a combustion and expansion stroke that is sensed by the crank angle sensor to a logarithmic value log V by the conversion map V;

a cylinder pressure waveform logarithm display means that has a logarithm map having coordinate axes of a logarithmic value log V of the cylinder volume corresponding to the crank angle and a logarithmic value log P of the cylinder pressure, reads the logarithmic value log P and the logarithmic value log V in the logarithm map to display a change in the cylinder pressure at least from a compression stroke to a combustion and expansion stroke as a logarithmically converted cylinder pressure waveform on the logarithm map;

a motoring waveform estimating means for estimating a motoring waveform representing a non-combustion cylinder pressure waveform which is obtained by subtracting a pressure rise developed by combustion in the cylinder of the internal combustion engine from the logarithmically converted cylinder pressure waveform, that is, corresponds to a state of non-combustion;

a determination line computing means for computing a determination line of an ignition timing on the basis of a base line of the estimated motoring waveform; and an ignition timing determining means for determining the ignition timing on the basis of the computed determination line and the logarithmically converted cylinder pressure waveform.

2. The controller for an internal combustion engine as claimed in claim 1, wherein the motoring waveform estimating means estimates the motoring waveform from the logarithmically converted cylinder pressure waveform on the basis of at least two points of the logarithmic value log P and the logarithmic value log V.

3. The controller for an internal combustion engine as claimed in claim 1, wherein the ignition timing determining means determines whether the logarithmic value log P read in the logarithm map exceeds the determination line and wherein when the ignition timing determining means determines that the logarithmic value log P read in the logarithm map exceeds the determination line, the ignition timing determining means finds the logarithmic value log V when the logarithmic value log P read in the logarithm map exceeds the determination line and determines that the crank angle θ corresponding to this logarithmic value log V is the ignition timing.

4. The controller for an internal combustion engine as claimed in claim 3, wherein when the ignition timing determining means determines that the logarithmic value log P does not exceed the determination line, the ignition timing determining means determines whether or not the crank angle θ corresponding to the logarithmic value log V is larger than a crank angle θend of a previously set ignition determination finishing timing and wherein when the following relation (a) holds, $$\theta \geqq \theta end \quad (a)$$

the ignition timing determining means determines that the internal combustion engine is in a state of misfire.

5. The controller for an internal combustion engine as claimed in claim 1, wherein a second injection is sprayed after a first injection during one combustion stroke of the internal combustion engine and wherein when an ignition timing for the second injection is sensed, the determination line computing means corrects the base line according to a command injection timing for the second injection and computes the determination line on the basis of the corrected base line.

6. The controller for an internal combustion engine as claimed in claim 5, wherein the determination line computing means corrects the base line such that the base line passes the logarithmic value log P at the command injection timing for the second injection.

7. The controller for an internal combustion engine as claimed in claim 1, wherein a second injection is sprayed after a first injection during one combustion stroke of the internal combustion engine and wherein when an ignition timing for the second injection is sensed, the determination line computing means corrects the base line according to a combustion finishing timing of the first injection and computes the determination line on the basis of the corrected base line.

8. The controller for an internal combustion engine as claimed in claim 7, wherein the determination line computing means corrects the base line such that the base line passes the logarithmic value log P at a combustion finishing timing of the first injection.

9. The controller for an internal combustion engine as claimed in claim 1, further comprising combustion finishing timing determining means for determining a combustion finishing timing of the internal combustion engine, wherein when the quantity of change in the logarithmic value log P is expressed by d log P and the quantity of change in the logarithmic value log V is expressed by d log V and the d log P and the d log V are expressed by the following equations (b) and (c), respectively, $$d \log P = \log P(i) - \log P(i-1) \quad (b)$$

$$d \log V = \log V(i) - \log V(i-1) \quad (c)$$

the combustion finishing timing determining means computes a gradient of the logarithmically converted cylinder pressure waveform by the following equation (d), $$\text{gradient} = d \log P / d \log V \quad (d),$$

and determines that a timing when the gradient of the computed cylinder pressure waveform is nearly constant after combustion is started is a combustion finishing timing.

10. The controller for an internal combustion engine as claimed in claim 1, further comprising;

a combustion quantity computing means for computing the quantity of combustion in one combustion stroke of the internal combustion engine, wherein when the quantity of increase in the logarithmic value log P at a combustion finishing timing or after a predetermined time from an ignition timing is expressed by Δ log P with respect to the base line of the motoring waveform, the combustion quantity computing means computes the quantity of combustion from the following equation (e), $$\Delta \log P + \log V \quad \text{(e)}.$$

11. The controller for an internal combustion engine as claimed in claim 1, further comprising:

a compression top dead center sensing means that senses a compression top dead center of the piston by a sensing the cylinder pressure with the cylinder pressure sensor under a specific operating state in which the cylinder pressure changes according to only a reciprocating motion of the piston without being affected by a combustion pressure developed by combustion in a cylinder; and a TDC correcting means for correcting a TDC signal outputted by the crank angle sensor on the basis of the sensed compression top dead center, wherein the compression top dead center sensing means has a base pressure of the cylinder pressure sensor, which is sensed at a base angle representing a certain base crank angle when the piston moves up in the cylinder, inputted thereto and then senses an objective angle representing a crank angle at which a sensing angle of the cylinder pressure sensor becomes equal to the base pressure when the piston moves down in the cylinder, and thereby senses a middle point between the base angle and the objective angle as the compression top dead center.

12. The controller for an internal combustion engine as claimed in claim 11, wherein the specific operating state is a non-combustion state in which no fuel injection is conducted.

13. The controller for an internal combustion engine as claimed in claim 11, wherein the specific operating state is a state in which a combustion starting timing is delayed.

14. The controller for an internal combustion engine as claimed in claim 11, wherein the compression top dead center sensing means sets the base angle in a region in which an increasing rate of the cylinder pressure is relatively large.

15. The controller for an internal combustion engine as claimed in claim 11, wherein a sensing analog signal value of the cylinder pressure sensor is inputted to the compression top dead center sensing means without passing a filter circuit from an input circuit of a separate system that performs no filtering processing.

16. The controller for an internal combustion engine as claimed claim 11, wherein when a sensing analog signal value of the cylinder pressure is inputted to the compression top dead center sensing means through a filter circuit to cause a phase delay by a filtering processing, the compression top dead center sensing means senses the compression top dead center by removing the phase delay.

17. The controller for an internal combustion engine as claimed in claim 16, wherein the compression top dead center sensing means finds a filter characteristic representing a correlation between an engine speed and the quantity of delay in phase on the basis of a compression top dead center sensed at a first engine speed and a compression top dead center sensed at a second engine speed and computes the quantity of delay in phase caused by the filtering processing from this filter characteristic.

* * * * *